Sept. 16, 1958

H. F. ALFERY ET AL 2,852,072

TIMED FLUID VALVE

Filed Jan. 18, 1954

INVENTOR.
HENRY F. ALFERY
RICHARD K. ENGHOLDT
BY
John W. Michael
ATTORNEY

Sept. 16, 1958 H. F. ALFERY ET AL 2,852,072
TIMED FLUID VALVE
Filed Jan. 18, 1954 2 Sheets-Sheet 2
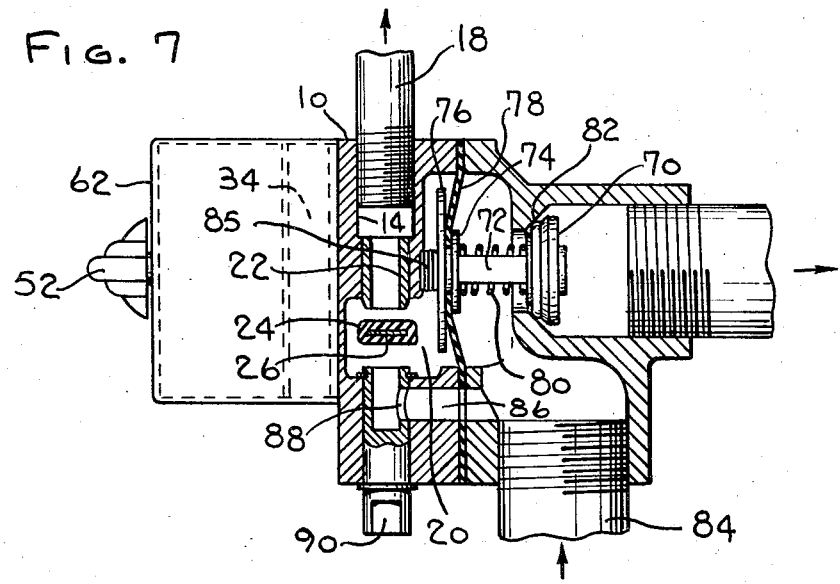
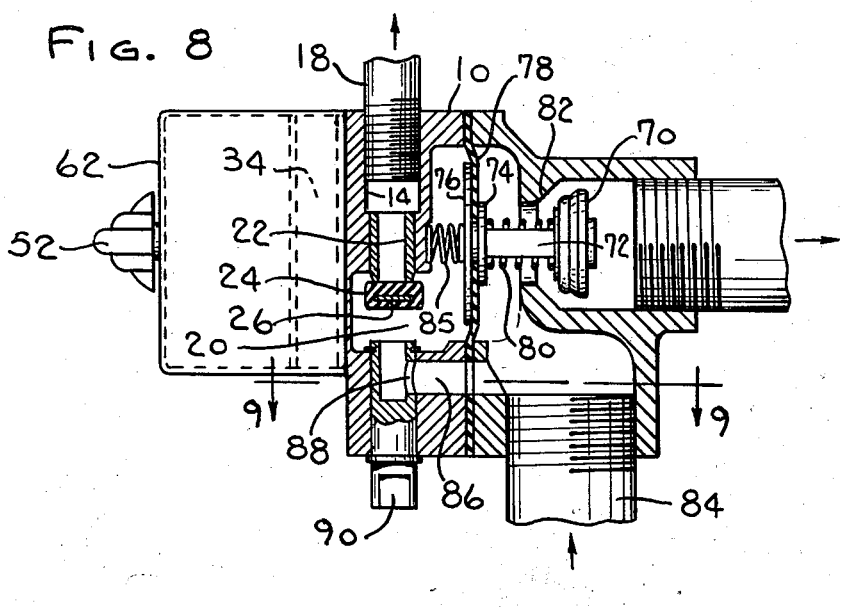
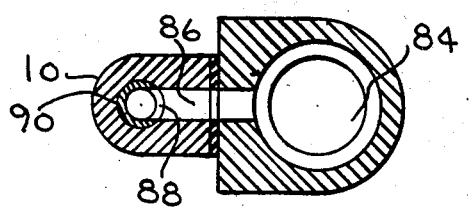
INVENTOR.
HENRY F. ALFERY
RICHARD K. ENGHOLDT
BY
*John W. Michael*
ATTORNEY United States Patent Office 2,852,072
Patented Sept. 16, 1958

2,852,072
TIMED FLUID VALVE

Henry F. Alfery, Hales Corners, and Richard K. Engholdt, Milwaukee, Wis., assignors to Erie Manufacturing Co., Milwaukee, Wis., a corporation of Wisconsin Application January 18, 1954, Serial No. 404,730

3 Claims. (Cl. 161—7)

This invention relates to a timed fluid valve. The invention encompasses both the clock-controlled valve and the regulation of a second valve by the clock-controlled valve without any mechanical interconnection of the valves.

An object of this invention is to provide a clock-controlled valve which will provide reliable service over many years.

Another object of this invention is to regulate the action of one valve by means of the action of a clock-controlled valve.

Still another object of this invention is to provide a clock-controlled valve which will operate reliably at infrequent intervals even though various substances have been deposited on the moving parts.

A novel structure is provided for transmitting the very small available force from the clock mechanism to the valve to control the operation of the valve. The clock mechanism and the valve assembly are so designed that placing the timer into operation results in manually opening the valve. The manual opening of the valve overcomes all resistance offered by any deposits which may have built up since the valve was last used. The valve stem is rotated rather than reciprocated and the manual actuation of the valve when cocking the timer necessarily results in the manual force being applied to rotating the valve shaft and shearing any deposits from the shaft where it contacts gaskets, bearings, or the like. Having thus sheared deposits from the stem at all points where binding might otherwise occur the valve is ready for smooth operation and will provide reliable service.

An additional feature found in the present valve is the ability to control a second valve by means of the clock-controlled valve. In the present construction the second valve is made to close when the clock-controlled valve is opened. Thus the present valve can operate as the equivalent of a clock-controlled three-way valve. Such a valve has a considerable field of use in connection with regeneration systems in water softeners.

Other objects and advantages will be pointed out in, or be apparent from, the specification and claims, as will obvious modifications of the two embodiments shown in the drawings, in which:

Fig. 7 is a view of a clock-controlled valve similar to that shown in Figs. 1 through 6 but including an additional valve which is operated by pressure variations occasioned by the position of the clock-controlled valve;

Fig. 8 is a view similar to Fig. 7 but shows the second valve in the open position with the clock valve closed; and Fig. 9 is a section as indicated by line 9—9 on Fig. 8 to illustrate the variable restriction.

Figure 1:
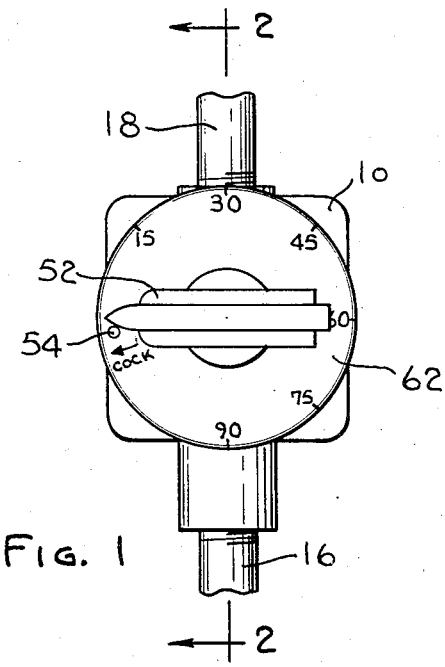
Fig. 1 is a plan view of the complete clock-controlled valve assembly and shows the face of the timer.
Figure 2:
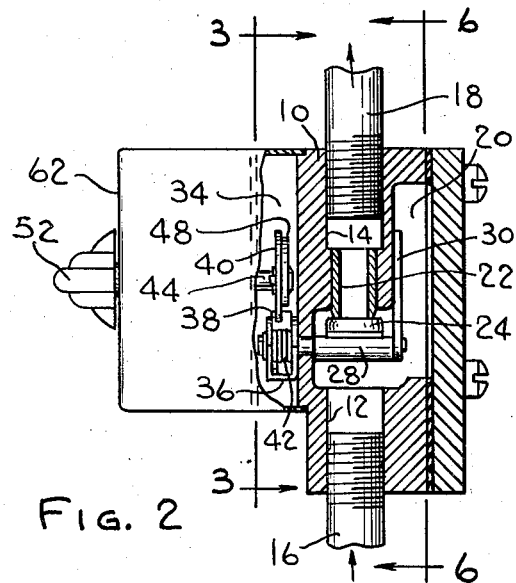
Fig. 2 is a fragmentary vertical section on line 2—2 of Fig. 1 and shows the multiple cam assembly together with the cam follower and valve assembly with the valve in the seated position.
Figure 3:
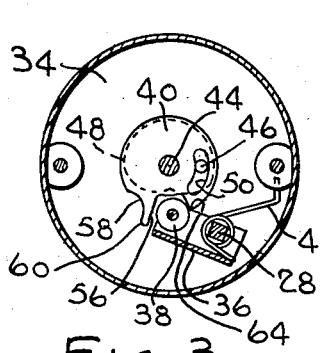
Fig. 3 is a section taken as indicated by line 3—3 in Fig. 2 and shows the cam and cam follower in the valve closed position corresponding to the position of the handle in Fig. 1.
Figure 4:
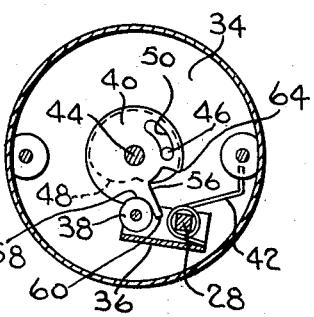
Fig. 4 is a view similar to Fig. 3 but shows the cam assembly rotated to the "cock" position.

Referring to the drawings in detail, Figs. 1 through 6 show the basic clock-controlled valve in which the clock times the duration of the valve opening. The assembly is mounted on a cast base or housing 10 which is provided with an inlet 12 and an outlet 14 adapted to receive inlet conduit 16 and outlet conduit 18, respectively. The inlet and outlet ports communicate with a generally circular recess or chamber 20. A valve seat 22 is mounted in the outlet port 14 and receives the face of valve 24 when the flow through the body 10 is interrupted. Valve 24 is mounted on an arm 26 carried by shaft or pin 28 which is pivotally mounted in plate 30 connected to the cast outlet port by screws 32, 32. The pin 28 extends through a cooperating hole in body 10 into the chamber 34 which houses the timer mechanism. Pin 28 is, of course, provided with a suitable gasket to prevent leakage from chamber 20 into chamber 34. This gasket is always exposed to the fluid in the inlet portion of the body 10 and therefore remains in contact with the inlet fluid at all times. The end of pin 28 which projects into the chamber 34 housing the timer mechanism is squared (see Figs. 3 through 5) and carries follower arm 36 in cooperating square holes to provide an inexpensive, positive connection between the two parts. Arm 36 is channel-like in nature and between the opposed sides is mounted a roller-type cam follower 38. This roller is freely rotatable so as to exert a minimum resistance to movement of cam 40, having in mind the very small power of a clock mechanism. The spring 42 urges arm 36 and roller 38 against the cam 40 (in the valve closing direction).

The cam 40 is rotatable with respect to clock shaft 44 but its movement with respect to shaft 44 is limited to that permitted by engagement of the pin 46, fixed on cam 48 and projecting into slot 50 in cam 40, and the ends of slot 50. The cam 48 is fixed with respect to the clock shaft 44 and is driven by conventional clock mechanism not herein illustrated. The clock mechanism is manually set by means of knob 52 which is shown in Fig. 1 against the stop pin 54 in the valve closed position. When the knob is in the position shown in Fig. 1 the cams 48 and 40 and cam follower 38 are in the position shown in Fig. 3.

Figure 5:
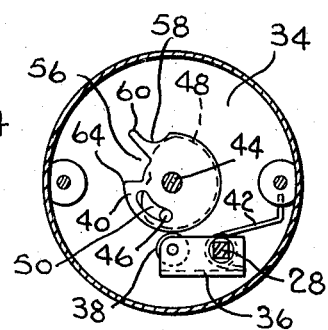
Fig. 5 is similar to Figs. 3 and 4 but shows the cam assembly in a normal timing position (the cam as illustrated is set for holding the valve open for about thirty minutes)
Figure 6:
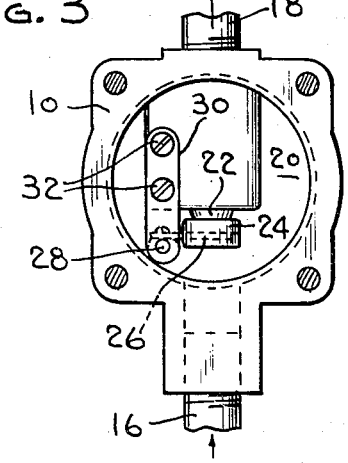
Fig. 6 is a section taken as indicated by line 6—6 on Fig. 2.

To open valve 24 knob 52 is rotated in a clockwise direction. This manual action causes the driving or cocking cam 48 to move in a clockwise direction until pin 46 engages the end of slot 50 in timing cam 40. Simultaneously with this action or just prior to this engagement the face of cam 48 has acted upon follower 38 to lift the follower out of notch 56 in the timer cam 40. The position occupied by the cams during this action may be seen in Fig. 4 although Fig. 4 does show the cams fully rotated in a clockwise direction until the follower 38 has dropped into the slight depression 58 in the timer cam. The depression 58 is immediately adjacent a finger 60 projecting from the timer cam 40 to prevent excessive rotation of the timer cam. When the parts are in the position shown in Fig. 4, that is with roller 38 seated in depression 58 on the timer cam, the knob has been rotated almost 360° to the cock position indicated on the dial 62. Since the driving force of a clock mechanism is extremely small the frictional resistance to the clock movement exerted by roller 38 on the timer cam 40 must be held to a minimum. Therefore, the depression 58 is provided to provide a positive engagement between the follower and the timer cam during the time that the knob is moved back from the cock position in a counter-clockwise direction sufficiently for pin 46 to engage the other end of slot 50 and rotate the two cams simultaneously to a point where the follower 38 has been lifted out of the depression 58. The timer will now run and positively drive the timer cam 40 for the necessary number of degrees to allow the roller to reach the edge 64 of the timer cam. When the roller drops into the notch there will be some slight rotation of timer cam 40 with respect to the driving cam 48 so that the cams end up in the relative position shown in Fig. 3. The availability of this slight relative rotation insures a rapid or snap closure of the valve which avoids damage to the seat found in slow-closing valves. As illustrated in Fig. 5 it will be noted that about 90° of rotation in a counter-clockwise direction are necessary before roller 38 reaches the drop off point 64 on the timer cam 40. Thus approximately thirty minutes time will be required for the timer to allow the spring 42 to move the follower 38 into notch 56 and simultaneously close valve 24 against its seat 22.

A brief inspection of Fig. 1 will demonstrate that approximately 90° rotation from the cock position in a counter-clockwise direction to the ninety minute setting are required to force the follower 38 out of depression 58 on the timer cam 40. The present timer, therefore, has a time range between zero and ninety minutes. That is, the valve may be held open by the clock mechanism for any desired time up to ninety minutes. It will be appreciated that other timer mechanisms could be provided to give different timed intervals.

It will be noted that when valve 24 is seated the line pressure in conduit 16 acts to hold the valve against the seat and thus prevent leakage. Should any deposits build up on shaft 28 during the inactive period of the valve these deposits are sheared off when the knob 52 is manually rotated to cock the valve since the manual force acts directly on the valve shaft. Therefore, shaft 28 is cleaned of all deposits during the opening movement and will operate freely to seat when allowed to do so by the timer mechanism. The clock mechanism is not called upon to exert any opening force. It is also to be noted that the seal between shaft 28 and the body 10 remains wet at all times since it is exposed to the inlet chamber. Therefore, this seal has no opportunity to dry out and become brittle or otherwise prone to leakage.

The timing mechanism and valve actuating mechanism embodied in the modification shown in Figs. 7 through 9 is the same as that shown in Figs. 1 through 6. This modification, however, incorporates an additional valve 70 which is mounted on a stem 72 carried by diaphragm pads 74, 76 mounted on either side of diaphragm 78. A strong spring 80 acts between diaphragm pad 74 and valve 70 to hold the valve relatively fixed with respect to the diaphragm pads. The valve can only adjust slightly with respect to its seat 82 but cannot move with respect to the diaphragm pad 74. The relatively rigid connection between the diaphragm and the valve has been found to be necessary when handling liquids to avoid water hammer effects when the valve 70 closes to its seat 82. A light spring 85 is compressed between diaphragm pad 76 and the body to urge the diaphragm and valve 70 towards the open position. The open position is shown in Fig. 8.

When the timer mechanism is actuated to open valve 24 flow from the inlet 84 is diverted through conduit 86 and adjustable restriction 88 to flow through outlet 18. Since the restriction 88 may be adjusted to occasion a considerable pressure drop in the fluid passing therethrough the pressure on the upper side of diaphragm 78 reduces to a pressure considerably under the line pressure below the diaphragm 78. Therefore, the diaphragm moves up (to the left) to seat valve 70 as shown in Fig. 7. At the end of the timed cycle valve 24 seats and the pressure on the lefthand side of diaphragm 78 builds up until it equals line pressure. At or prior to this moment the spring 85 moves the diaphragm down (towards the right) to open valve 70. It will be appreciated that with this arrangement the assembly functions as a three-way valve. Thus when one line is opened to flow another line is closed. This valve has considerable use in connection with regeneration systems in water softeners.

It will be noted that restriction 88 may be adjusted by turning the head 90 of the restrictor stem. Reference to Fig. 9 shows the manner in which rotation of the restrictor stem to any position other than that illustrated in Fig. 9 will decrease the size of the passage. Even with the restrictor in the position shown in Fig. 9 sufficient restriction is obtained to occasion enough pressure drop to operate the diaphragm.

The present valves are used in valving liquids or gasses with equal success. Accordingly the valves are properly referred to as fluid valves.

The valve arrangement per se is shown and claimed in our application Serial No. 635,284, which is a division of the present application.

Although but two embodiments of the present invention have been illustrated and described it will be apparent to those skilled in the art that various other changes and modifications may be made therein without departing from the spirit of the invention or from the scope of the appended claims.

We claim:

1. A clock controlled valve assembly comprising, a body having a chamber provided with an inlet and an outlet, a shaft in the chamber and projecting through the body and a valve carried by the shaft for movement as the shaft is rotated to control flow through the outlet, a timer mechanism mounted in the exterior of the valve body, said timer including manual cocking mechanism for winding the timer spring and setting the selected time, a drive cam connected to the timer, a timer cam mounted for rotation with or without respect to the drive cam, cam follower means comprising a rotatable roller connected to the shaft and adapted to ride on the timer cam, a lost motion connection between the drive and timer cams for rotating both cams to a "cock" position when the timer mechanism is actuated, means on the timer cam for engaging the roller and the timer cam in "cock" position until the drive cam has been manually rotated enough to take up the lost motion between the cams and to engage the cams for driving movement by the clock.

2. A clock valve according to claim 1 in which the last named means comprises a depression in the cam surface, said roller dropping in the depression at the end of the cocking motion of the drive cam and remaining therein until the drive cam has been rotated in a reverse direction enough to take up the lost motion and to drive the timer cam to move the depression from the roller.

3. A clock valve according to claim 2 including a spring acting on the shaft to urge the roller towards the timer cam and the valve towards its closed position.

References Cited in the file of this patent

UNITED STATES PATENTS

| | | |
|---|---|---|
| 1,085,012 | Bopp | Jan. 20, 1914 |
| 1,249,293 | Norwood | Dec. 4, 1917 |
| 1,856,138 | Ruemelin | May 3, 1932 |
| 2,030,451 | Kerr et al. | Feb. 11, 1936 |
| 2,105,282 | Dolby | Jan. 11, 1938 |
| 2,249,442 | Thornbery | July 15, 1941 |
| 2,274,776 | Cull | Mar. 3, 1942 |
| 2,398,007 | Hunter | Apr. 9, 1946 |
| 2,556,908 | Engholdt | June 12, 1951 |
| 2,629,437 | Weeks | Feb. 24, 1953 |
| 2,630,831 | Arnold | Mar. 10, 1953 |
| 2,656,672 | Webber | Oct. 27, 1953 |
| 2,660,396 | Heagerty | Nov. 24, 1953 |
| 2,710,162 | Snoddy | June 7, 1955 |
| 2,715,009 | Beekley | Aug. 9, 1955 |